July 17, 1962          J. FIEUX          3,044,346
UNIVERSALLY ADJUSTABLE CAMERA SUPPORT FOR A VEHICLE
Filed July 31, 1959          2 Sheets-Sheet 1
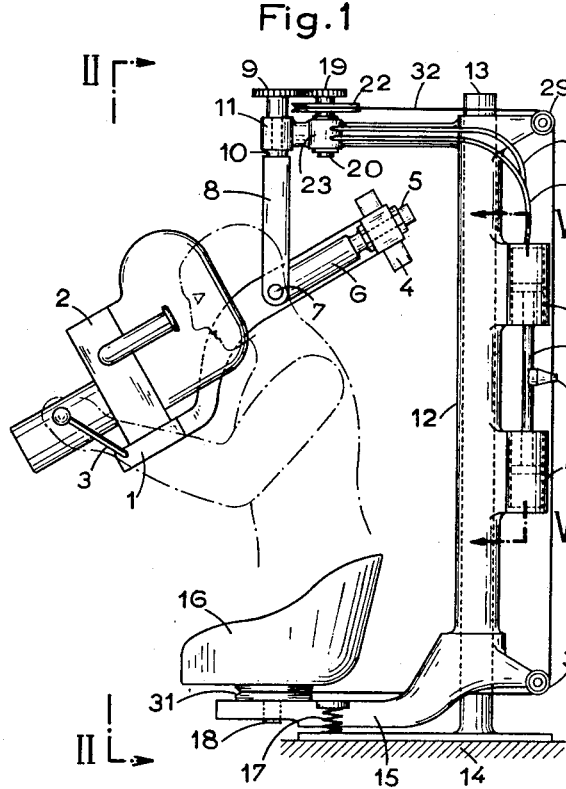
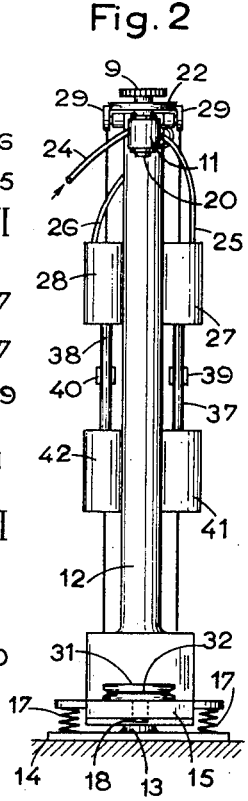
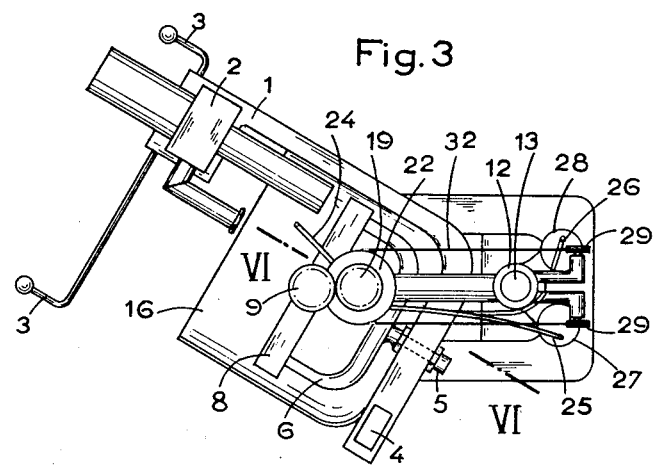

July 17, 1962 J. FIEUX 3,044,346
UNIVERSALLY ADJUSTABLE CAMERA SUPPORT FOR A VEHICLE
Filed July 31, 1959 2 Sheets-Sheet 2

United States Patent Office 3,044,346
Patented July 17, 1962

3,044,346
UNIVERSALLY ADJUSTABLE CAMERA SUPPORT FOR A VEHICLE
Jean Fieux, Paris, France, assignor of one-half interest to Societe des Forges et Ateliers du Creusot, Paris, France, a company of France
Filed July 31, 1959, Ser. No. 830,758
Claims priority, application France Aug. 6, 1958
6 Claims. (Cl. 88—16)

The invention relates to a holder for an appliance for sighting from a vehicle subject to vibration, such as a helicopter, the sighting appliance being, for example, a cinematographic camera.

The usual holders for motion-picture cameras do not enable films having any true artistic value to be taken from a helicopter, the image obtained in the field of vision generally being blurred and unstable.

The present invention relates to a holder eliminating the disadvantages which have just been indicated.

The holder according to the invention enables the amplitude of oscillation of the optical axis of the camera to be reduced to a completely negligible value, and jerks in aiming the sight, due to muscular fatigue and nervous tension on the part of the operator, are virtually avoided.

According to the invention, the holder comprises a pedestal mounted on the vehicle, an arm fast with the sighting appliance and a universal joint between the gallows and the arm, a recess being left inside the universal joint in order to allow the observer to place his head therein while sighting.

Other features of the invention will become apparent from the following description of a particular method of embodiment which is concerned with taking cinematographic pictures from a helicopter. Some of these features relate to the pivoted mounting of the observer's seat, and to the manner in which the said seat is pivoted under servo-control by rotation of the camera about a vertical axis.

FIGURE 1 is a side view of a holder according to the invention, carrying a cinematograph camera.

FIGURE 2 is a view along II—II in FIGURE 1, the universal joint, the camera and the observer's seat being removed.

FIGURE 3 is a plan view of the holder illustrated in FIGURE 1, the universal joint being pivoted through a certain angle about a vertical axis.

Figure 6:
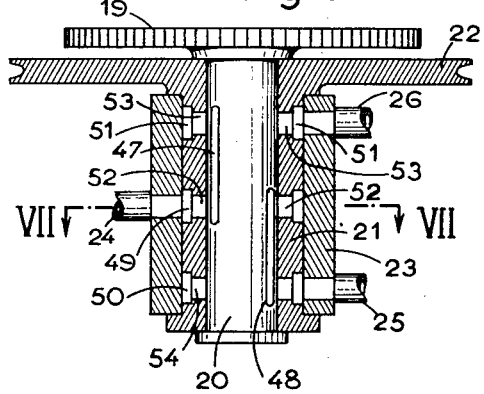
FIGURE 6 is a section along VI—VI in FIGURE 3 of a fluid-distributor for operating a servo-motor which places the movements of the seat under servo-control by rotation of the universal joint about a vertical axis.
Figure 4:
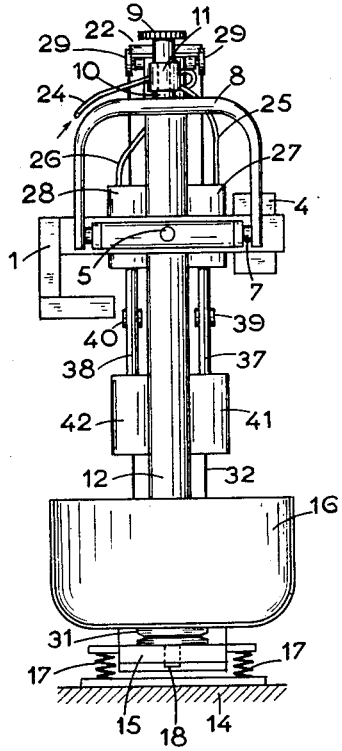
FIGURE 4 is a view along II—II in FIGURE 1, the universal joint and the seat being in position.
Figure 7:
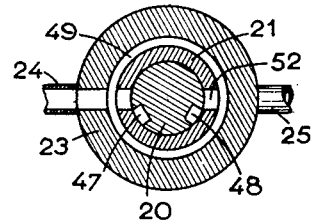
FIGURE 7 is a section along VII—VII in FIGURE 6.
Figure 5:
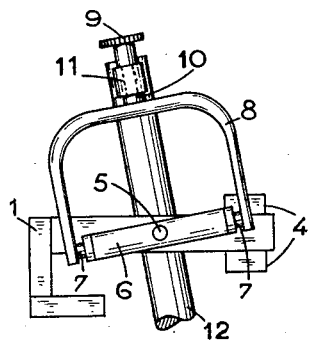
FIGURE 5 is a partial view along II—II in FIGURE 1, the support being tilted because the helicopter is tilted, and the camera being removed.
Figure 8:
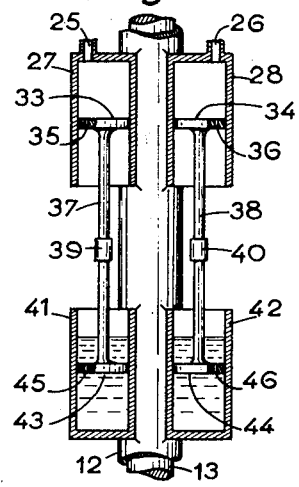
FIGURE 8 is a section along VIII—VIII in FIGURE 1.

The holder illustrated in the drawings comprises an arm 1 to which is attached a cinematographic camera 2. The arm 1 is equipped with aiming handles 3 and balance masses 4. These masses are preferably detachable, so that they may be easily replaced if the camera is replaced by one of different weight, or more simply if it is desired to replace the objectives or add an additional accessory.

The arm 1 is journalled along an axis parallel to the optical axis of the camera, by means of a journal 5, on a U-shaped member 6, which is itself suspended by journals 7 from a second U-shaped member 8. The two U-shaped members 6 and 8 are thus articulated to one another by journals or pivots 7 whereof the axes are perpendicular to the optical axis of the camera, and are aligned.

The U-shaped member 8 is pivotably mounted by virtue of a journal 10, on the arm 11 of a pedestal. The pedestal comprises a hollow standard 12 engaging with a mast 13 which is fast with the floor 14 of the helicopter. A base 15, intended to receive the observer's seat 16, is attached to the standard 12.

Springs 17 support the base 15, and consequently the standard 12 and the arm 11 of the pedestal.

The standard 12 and the mast 13 constitute a telescopic system, with a substantially vertical axis, whereof the moving part 12 is elastically supported by the springs 17.

The seat 16 is pivotably mounted on the base 15 by a journal or pivot 18.

Because of the way in which they are fitted, the U-shaped members 6 and 8 form a universal joint for the arm 1 upon which the camera is mounted, adn leave an internal recess in which the observer can place his head while sighting.

Furthermore, the journals of the universal joint converge at a fictitious meeting point situated substantially in the region of the cervical vertebrae of the observer sitting on the seat 16. The axis of the pivot 18 also passes through this fictitious meeting point.

The journal 10 is fast with a pinion 9 meshing with a pinion 19 of the same diameter fast with a spindle 20 which forms the interval slide-valve of a distributor for air under pressure. The slide-valve 20 rotates freely in an external slide-valve 21 in the same distributor. The slide-valve 21 is fast with a pulley 22.

The slide-valve 21 rotates in the container 23 of the distributor which is supplied with air under pressure via a duct 24. This supply does not involve any difficulty in a helicopter, which always has available a source of air under sufficient pressure.

The container 23 also comprises ducts 25 and 26 leading to two pneumatic servo-motors 27 and 28.

The standard 12 is equipped with two pulleys 29 at the top, and two pulleys 30 at the bottom.

Moreover, the pivot 18 is fast with a pulley 31 of the same diameter as the pulley 22. An endless cable 32, guided by the pulleys 29 and 30, winds without slipping or crossing round the pulleys 22 and 31.

The pneumatic servo-motors 27 and 28 are attached to the standard 12. They consist of cylinders wherein there are slide pistons 33 and 34, each pierced with one or more small orifices 35 or 36 which allow a slight air leakage. It follows from this that if air under pressure is delivered to one of the two cylinders 27 or 28 in order to push the corresponding piston downwards, the other piston can rise in its cylinder, the air in the latter leaking through the corresponding orifice or orifices in the piston.

Each rod 37 or 38 of the pistons 35 and 36 is coupled to the corresponding portion of the cable 32 by a finger 39 or 40.

The servo-motors 27 and 28 can thus cause either of the corresponding portions of the cable 32 to be pulled downwards.

A dashpot 41 or 42 is combined with each servomotor 27 or 28, and consists of a cylinder wherein a piston 43 or 44 pierced with leakage orifices 45 or 46 can move.

The dashpots 41 or 42 prevent the portions of the cable 32 from moving too suddenly, and consequently prevent the seat 16 and the external slide-valve 21 of the distributor from rotating too rapidly.

The slide-valves 20 and 21 of the distributor rotate in the same direction.

The slide-valve 20 comprises vertical grooves 47 and 48. The slide-valve 21 comprises annular channels 49, 50 and 51.

The channel 49 opens out into orifices 52 in the external slide-valve 21, situated respectively at the height of the lower end of the groove 47 and of the upper end of the groove 48.

The annular channel 51 opens out on the one hand into the orifice of the duct 26 and into orifices 53 in the slide-valve 21, situated at the height of the upper end of the groove 47.

The annular channel 50 opens out into the orifice of the duct 25 and into orifices 54 in the external slide-valve 21, at the height of the lower end of the groove 48.

The distributor which has just been described can thus distribute air under pressure to one or other of the servo-motors 27 and 28, according to the direction in which the pinion 19 rotates, that is to say according to the direction in which the camera rotates about a vertical axis which is the axis of the pivot 10.

Rotation of the internal slide-valve thus causes one of the servo-motors to be set in motion, that is to say starts the cable 26, which rotationally drives the external slide-valve 21 of the distributor on the one hand and the observer's seat 16 on the other hand.

When the observer rotates his camera by moving a handle 3, he therefore simultaneously causes his seat to rotate in the same direction and through the same angle.

There is thus complete servo-control between movement of the camera and of the observer's seat.

It may be indicated that the holder according to the invention offers the advantage of transmitting directly to the axes of the journals and pivots, that is to say to the suspension axes, the inertia forces resulting from small orbital movements maintained by fuselage vibration, and of thus preventing the formation of high-frequency alternating torques which would be of such a nature as to blur the image.

In addition, by virtue of these articulations, and of the fact that its elements are balanced, the orientatable system practically takes the form of a neutral-balance suspended system, whatever deformation is imposed on it by the observer. The latter's reflexes may thus be given free play in imparting correct and continuous aim to the camera without jerks.

Moreover, it should be noted that his overlapped position in the suspension device enables the operator to follow the sight within a field of widely extended height and direction simply by moving his head, to the exclusion of any translational movement of the body, which would besides be scarcely compatible with the small size of the platform.

In addition, automatic orientation of the observer's seat, under servo-control, increases convenience in use by enforcing positional symmetry, with resulting symmetry in the action of the operator's arms.

Finally, it should be noted that sudden changes in orientation of the helicopter have no effect on the azimuthal orientation of the camera, because of the existence of servo-control between rotation of the seat and rotation of the camera about a vertical axis.

The invention is naturally not limited to the details of the method of embodiment which has just been described, the said details being capable of modification without departing from the scope of the invention.

What I claim is:

1. In a holder for an appliance for sighting from a vehicle subject to vibration, such as a helicopter, a camera, an arm secured to said camera, a substantially vertical pedestal mounted on the vehicle and a joint between said pedestal and said arm having three separate axes of free rotation, a first axis for rotation in elevation, a second axis for rotation in azimuth spaced from and parallel to said pedestal and the third axis for rotation parallel to the optical axis of said camera, said joint including a first fork mounted for rotation in said pedestal in said second axis, a second fork pivoted at its opposed extremities to the opposed extremities of said first fork for rotation in said first axis, a pivoted connection between said second fork and said arm in said third axis, said arm and said camera being balanced about the center of said joint and at least one aiming handle symmetrical with said third axis for moving said camera, the point of intersection of the three axes of rotation of said joint being situated substantially in the region of the user's cervical vertebrae, and a seat for the observer mounted on said standard for rotation about a vertical axis and servo-controlled mechanism for rotating said seat upon rotation of said arm about said second axis in the same direction and through substantially the same angle as said arm.

2. A holder for a camera as described in claim 1 in which said servo-controlled mechanism includes a control device actuated by rotation of said arm and flexible connecting means between said seat and said control device.

3. A holder for a camera as described in claim 2 in which said control device comprises at least one servo-motor driving said connecting means and a member actuated by rotation of said arm for controlling said servo-motor.

4. A holder for a camera as described in claim 3 in which said member includes a distributor for air under pressure supplying said servo-motor.

5. A holder for a camera as described in claim 4 in which said air-distributor comprises two coaxial rotary valves, intercommunicating passages in said valves, one of said valves being rotated by rotation of said arm and the other of said valves being rotated by said connecting means in the same direction as said first valve.

6. In a holder for an appliance for sighting from a vehicle subject to vibration, such as a helicopter, a camera, an arm secured to said camera, a substantially vertical pedestal mounted on the vehicle and a joint between said pedestal and said arm having three separate axes of free rotation, a first axis for rotation in elevation, a second axis for rotation in azimuth spaced from and parallel to said pedestal and the third axis for rotation parallel to the optical axis of said camera, said joint including a first fork mounted for rotation in said pedestal in said second axis, a second fork pivoted at its opposed extremities to the opposed extremities of said first fork for rotation in said first axis, a pivoted connection between said second fork and said arm in said third axis, said arm and said camera being balanced about the center of said joint and at least one aiming handle symmetrical with said third axis for moving said camera, the point of intersection of the three axes of rotation of said joint being situated substantially in the region of the user's cervical vertebrae, said third axis substantially coinciding with the optical axis of said camera.

References Cited in the file of this patent

UNITED STATES PATENTS

| | | |
|---|---|---|
| 1,701,258 | Clement et al. | Feb. 5, 1929 |
| 2,316,139 | Wottring | Apr. 6, 1943 |

FOREIGN PATENTS

| | | |
|---|---|---|
| 662,734 | France | Mar. 25, 1929 |
| 39,742 | France | Nov. 24, 1941 |
| 1,014,819 | France | Mar. 20, 1950 |
| 748,027 | Great Britain | Apr. 18, 1956 |